(12) United States Patent
Osawa et al.

(10) Patent No.: US 12,063,603 B2
(45) Date of Patent: Aug. 13, 2024

(54) USER EQUIPMENT AND BASE STATION APPARATUS

(71) Applicant: NTT DOCOMO, INC., Tokyo (JP)

(72) Inventors: Ryosuke Osawa, Tokyo (JP); Yuichi Kakishima, Tokyo (JP); Huan Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 31 days.

(21) Appl. No.: 17/257,885

(22) PCT Filed: Jul. 9, 2018

(86) PCT No.: PCT/JP2018/025921
§ 371 (c)(1),
(2) Date: Jan. 5, 2021

(87) PCT Pub. No.: WO2020/012540
PCT Pub. Date: Jan. 16, 2020

(65) Prior Publication Data
US 2021/0282099 A1    Sep. 9, 2021

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0048* (2013.01); *H04W 24/10* (2013.01); *H04W 72/12* (2013.01)

(58) Field of Classification Search
CPC ............... H04W 56/00; H04W 56/001; H04W 56/0015; H04W 72/00; H04W 72/12;
(Continued)

(56) References Cited

U.S. PATENT DOCUMENTS 9,838,163 B2    12/2017    Kim et al.
2010/0017672 A1*  1/2010   Suga .................... H04B 7/2606
                                                      714/748
(Continued)

FOREIGN PATENT DOCUMENTS

CN    103108405 A    5/2013
JP    2011-244458 A  12/2011
(Continued)

OTHER PUBLICATIONS

International Search Report issued in Application No. PCT/JP2018/025921, mailed on Sep. 18, 2018 (5 pages).
(Continued)

*Primary Examiner* — Warner Wong
(74) *Attorney, Agent, or Firm* — Osha Bergman Watanabe & Burton LLP

(57) ABSTRACT

A user equipment communicates with a first user equipment or a base station apparatus, the user equipment including a receiving unit configured to receive a synchronization signal or a reference signal used in sidelink transmitted from the first user equipment; a control unit configured to measure a channel state of sidelink, based on the synchronization signal or the reference signal; and a transmitting unit configured to transmit, to the base station apparatus or the first user equipment, information indicating the channel state of sidelink.

5 Claims, 7 Drawing Sheets

(51) Int. Cl.
*H04W 24/10* (2009.01)
*H04W 72/12* (2023.01)

(58) Field of Classification Search
CPC ......... H04W 72/1226; H04W 72/1252; H04W 72/1263; H04W 72/1278; H04W 24/00; H04W 24/10; H04W 28/0875; H04L 5/003; H04L 5/0048; H04L 1/00; H04L 47/822; H04L 43/00; H04L 43/08; H04L 67/104; H04L 76/14; H04L 76/23
See application file for complete search history.

(56) References Cited

U.S. PATENT DOCUMENTS

| | | | | |
|---|---|---|---|---|
| 2014/0219095 | A1* | 8/2014 | Lim | H04W 76/14 370/235 |
| 2014/0376463 | A1* | 12/2014 | Kim | H04W 76/14 370/329 |
| 2015/0119088 | A1* | 4/2015 | Lee | H04W 68/005 455/458 |
| 2015/0163689 | A1* | 6/2015 | Lee | H04W 76/14 370/328 |
| 2015/0249981 | A1* | 9/2015 | Wu | H04W 24/10 370/329 |
| 2016/0100419 | A1* | 4/2016 | Wang | H04W 72/0446 370/329 |
| 2016/0173239 | A1* | 6/2016 | Kim | H04W 72/042 370/329 |
| 2016/0192420 | A1* | 6/2016 | Kim | H04W 4/06 370/329 |
| 2018/0146494 | A1* | 5/2018 | Khoryaev | H04W 76/14 |
| 2018/0206176 | A1* | 7/2018 | Panteleev | H04W 72/1231 |
| 2019/0150157 | A1* | 5/2019 | Panteleev | H04W 72/0486 370/329 |
| 2019/0208539 | A1* | 7/2019 | Christoffersson | H04W 72/042 |
| 2020/0236666 | A1* | 7/2020 | Yu | H04W 72/0446 |
| 2021/0076236 | A1* | 3/2021 | Kimura | H04W 16/18 |
| 2022/0015043 | A1* | 1/2022 | Yoshioka | H04W 52/325 |
| 2023/0379083 | A1* | 11/2023 | Wijesinghe | H04W 72/0446 |

FOREIGN PATENT DOCUMENTS

| | | | | |
|---|---|---|---|---|
| KR | 20180112242 | * | 10/2018 | ............ H04W 52/48 |
| WO | 2017/026970 A1 | | 2/2017 | |
| WO | 2017/026977 A1 | | 2/2017 | |

OTHER PUBLICATIONS

Written Opinion issued in International Application No. PCT/JP2018/025921, mailed on Sep. 18, 2018 (4 pages).

3GPP TS 36.211 V15.1.0, Release 15; "3rd Generation Partnership Project; Technical Specification Group Radio Access Network; Evolved Universal Terrestrial Radio Access (E-UTRA); Physical channels and modulation;" Mar. 2018; Sophia Antipolis Valbonne, France (221 pages).

3GPP TR 22.886 V15.1.0, Release 15; "3rd Generation Partnership Project; Technical Specification Group Services and System Aspects; Study on enhancement of 3GPP Support for 5G V2X Services;" Mar. 2017; Sophia Antipolis Valbonne, France (58 pages).

3GPP TSG-RAN WG1 Meeting #74; R1-133148; "Study on D2D Communication;" ZTE; Aug. 19-23, 2013; Barcelona, Spain (8 pages).

3GPP TSG RAN WG1 Meeting #74; R1-134376; "Synchronization for D2D communication;" Panasonic; Oct. 7-11, 2013; Guangzhou, China (2 pages).

Extended European Search Report issued in counterpart European Patent Application No. 18925890.8, mailed on Feb. 14, 2022 (11 pages).

Office Action issued in counterpart Chinese Patent Application No. 201880095279.2 mailed on May 24, 2023 (17 pages).

Office Action issued in Japanese Application No. 2022-122936; Dated Nov. 14, 2023 (6 pages).

Office Action issued in corresponding Chinese Application No. 201880095279.2, mailed Apr. 12, 2024 (10 pages).

Office Action issued in corresponding European Application No. 18925890.8, mailed Apr. 23, 2024 (9 pages).

Office Action issued in Japanese Application No. 2022-122936, mailed on Mar. 5, 2024 (5 pages).

* cited by examiner

USER EQUIPMENT AND BASE STATION APPARATUS

TECHNICAL FIELD

The present invention relates to a user equipment and a base station apparatus in a radio communication system.

BACKGROUND ART

In LTE (Long Term Evolution) and successor systems of LTE (for example, LTE-A (LTE Advanced) and NR (New Radio) (also referred to as 5G)), a D2D (Device to Device) technology in which user equipments directly communicate with each other without involving a radio base station, is being studied (for example, Non-Patent Literature 1).

D2D reduces the traffic between the user equipment and the base station apparatus, and enables communication between the user equipments even when the base station apparatus becomes unable to communicate in the event of a disaster, etc. Note that in 3GPP (3rd Generation Partnership Project), D2D is referred to as "sidelink"; however, in the present specification, D2D, which is a more general term, is used. However, sidelink is also used as necessary in the description of the embodiment to be described later.

D2D is generally classified into D2D discovery (also referred to as D2D detection) for discovering other communicable user equipments and D2D communication (also referred to as D2D direct communication, inter-terminal direct communication, etc.) for user equipments to directly communicate with each other. In the following description, when D2D communication, D2D discovery, etc., are not particularly distinguished, these may be simply referred to as D2D. Furthermore, signals used for transmission and reception in D2D are referred to as D2D signals. Various cases of using services related to V2X (Vehicle to Everything) in NR are being studied (for example, Non-Patent Literature 2).

CITATION LIST

Non-Patent Literature

[NPTL 1] 3GPP TS 36.211 V15.1.0 (2018-03)
[NPTL 2] 3GPP TR 22.886 V15.1.0 (2017-03)

SUMMARY OF INVENTION

Technical Problem

In the D2D communication, when managing the quality of service (Qos), it is required to measure the quality of the D2D communication and to make appropriate feedback to the user equipment on the transmitting side. However, in the conventional D2D communication, feedback of measurement results has not been supported.

The present invention has been made in view of the above points, and an object of the present invention is to appropriately control communication quality in inter-terminal direct communication.

Solution to Problem

According to the disclosed technology, there is provided a user equipment that communicates with a first user equipment or a base station apparatus, the user equipment including a receiving unit configured to receive a synchronization signal or a reference signal used in sidelink transmitted from the first user equipment; a control unit configured to measure a channel state of sidelink, based on the synchronization signal or the reference signal; and a transmitting unit configured to transmit, to the base station apparatus or the first user equipment, information indicating the channel state of sidelink.

Advantageous Effects of Invention

According to the disclosed technology, in inter-terminal direct communication, the communication quality can be appropriately controlled.

DESCRIPTION OF EMBODIMENT

Figure 1:
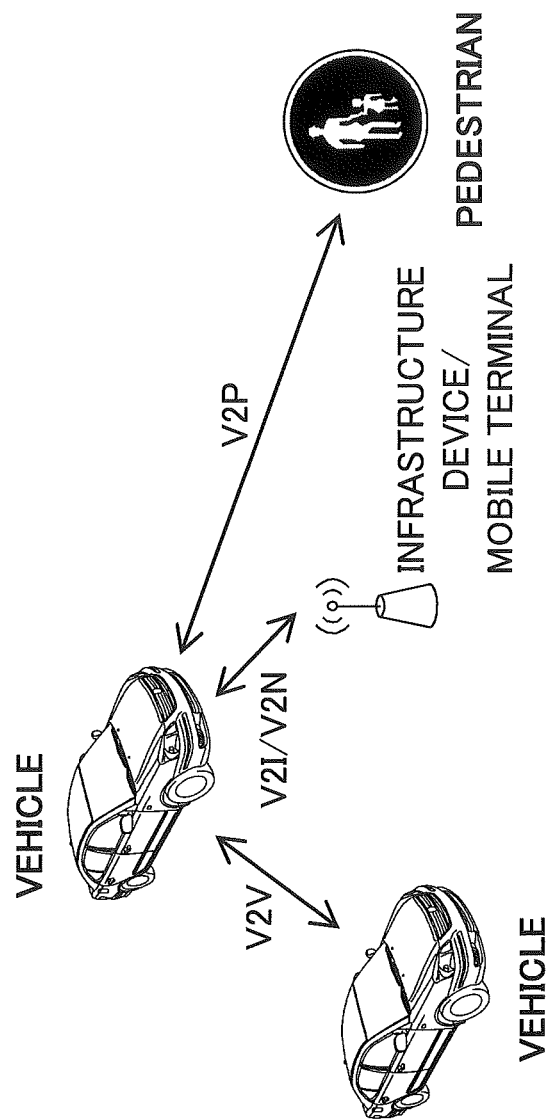
FIG. 1 is a diagram for describing V2X.

Hereinafter, an embodiment of the present invention will be described with reference to the drawings. Note that the embodiment described below is merely an example, and embodiments to which the present invention is applied are not limited to the following embodiment.

In the operation of the radio communication system according to an embodiment of the present invention, the existing technology is appropriately used. The existing technology is, for example, existing LTE; however, the existing technology is not limited to existing LTE. Furthermore, the term "LTE" used in the present specification shall have a broad meaning including LTE-Advanced and methods after LTE-Advanced (e.g., NR) unless otherwise specified.

Furthermore, in the present embodiment, the duplex method may be the TDD (Time Division Duplex) method, the FDD (Frequency Division Duplex) method, or other methods (for example, the Flexible Duplex method).

Furthermore, in the following description, the method of transmitting signals by using transmission beams, may be digital beamforming for transmitting signals multiplied by precoding vectors (precoded with precoding vectors), or may be analog beamforming for realizing beamforming by using a variable phase shifter in an RF (Radio Frequency) circuit. Similarly, the method of receiving signals by using reception beams, may be digital beamforming for multiplying received signals by a predetermined weight vector, or analog beamforming for realizing beamforming by using a variable phase shifter in an RF circuit. Hybrid beamforming, in which digital beamforming and analog beamforming are combined, may be applied. Also, transmitting signals by using transmission beams, may be to transmit signals at a particular antenna port. Similarly, receiving signals by using reception beams may be to receive signals at a particular antenna port. An antenna port refers to a logical antenna port or a physical antenna port defined in the 3GPP standard. Furthermore, the precoding or the beamforming may be referred to as a precoder or a spatial domain filter, etc.

Note that the method of forming a transmission beam and a reception beam is not limited to the above method. For example, in the base station apparatus 10 or the user equipment 20 having a plurality of antennas, a method of changing the angle of each antenna may be used, or a method using a combination of a method of using a precoding vector and a method of changing the angle of the antenna may be used, a method of switching between different antenna panels may be used, a method of combining a plurality of antenna panels may be used, or another method may be used. Furthermore, for example, in the high frequency band, a plurality of mutually different transmission beams may be used. Using a plurality of transmission beams is referred to as a multi-beam operation, and using one transmission beam is referred to as a single beam operation.

Furthermore, in the embodiment of the present invention, the radio parameter, etc., being "configured" means that a predetermined value is "pre-configured", or a radio parameter, which is reported from the base station apparatus 10 or a user equipment 20, is configured.

FIG. 1 is a diagram for describing V2X. In 3GPP, studies are being made to realize V2X (Vehicle to Everything) or eV2X (enhanced V2X) by extending the D2D function, and specifications of V2X are being made. As illustrated in FIG. 1, V2X is a part of ITS (Intelligent Transport Systems), and V2X is a collective term of V2V (Vehicle to Vehicle) meaning a communication mode implemented between vehicles, V2I (Vehicle to Infrastructure) meaning a communication mode implemented between a vehicle and a roadside unit (RSU) installed at the side of a road, V2N (Vehicle to Nomadic device) meaning a communication mode implemented between a vehicle and a mobile terminal held by a driver), and V2P (Vehicle to Pedestrian) meaning a communication mode implemented between a vehicle and a mobile terminal of a pedestrian.

Furthermore, in 3GPP, V2X using cellular communication and inter-terminal communication of LTE or NR is being studied. For V2X of LTE or NR, it is assumed that studies not limited to the 3GPP specification, will be advanced. For example, it is assumed that securing interoperability, reducing costs by implementing an upper layer, a method of using a plurality of RATs (Radio Access Technology) in combination or a method of switching the RATS, addressing regulations in each country, acquiring and distributing data of a V2X platform of LTE or NR, and managing and using a database, will be studied.

In the embodiments of the present invention, a mode in which a communication apparatus is installed in a vehicle is mainly assumed; however, the embodiment of the present invention is not limited to such a mode. For example, the communication apparatus may be a terminal held by a person, or the communication apparatus may be an apparatus installed in a drone or an aircraft, or the communication apparatus may be a base station, an RSU, or a relay station (relay node), etc.

Note that SL (Sidelink) may be distinguished based on either UL (Uplink) or DL (Downlink) or one of or a combination of the following 1)-4). Furthermore, the SL may be another name.

1) Resource allocation in time domain
2) Resource allocation in the frequency domain
3) Synchronization signals (including SLSS (Sidelink Synchronization Signal)) to be referred to
4) Reference signals used for path loss measurement for transmission power control In SL of LTE, Mode 3 and Mode 4 are defined with respect to resource allocation for SL to the user equipment 20. In Mode 3, transmission resources are dynamically allocated by DCI (Downlink Control Information) transmitted from the base station apparatus 10 to the user equipment 20. Furthermore, in Mode 3, SPS (Semi Persistent Scheduling) is also possible. In Mode 4, the user equipment 20 autonomously selects a transmission resource from the resource pool.

Furthermore, SLSS is supported in SL of LTE. On the other hand, in SL of LTE, feedback in the PHY (Physical) layer, the MAC (Media Access Control) layer, and the RRC (Radio Resource Control) layer has not been supported. That is, reports of RSRP (Reference Signal Received Power) or RSRQ (Reference Signal Received Quality) of layer 1, or reports of CSI (Channel State Information), have not been supported.

Figure 2:
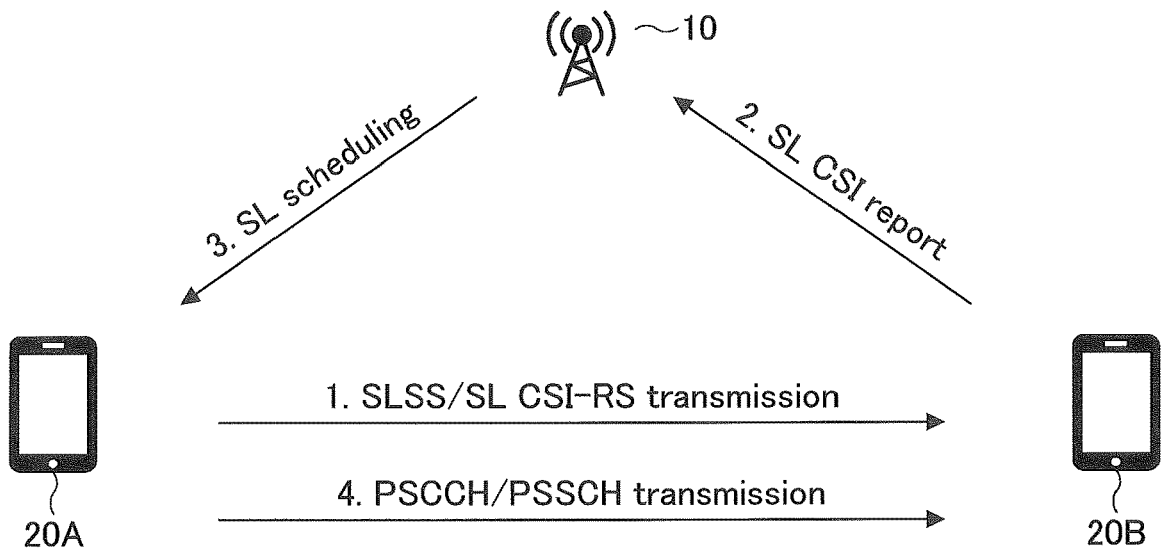
FIG. 2 is a diagram for describing an example (1) of a CSI report according to an embodiment of the present invention.

FIG. 2 is a diagram for describing an example (1) of the CSI report according to the embodiment of the present invention. It is assumed that QoS is managed in SL of NR. Therefore, it is assumed that SLSS and SL-CSI-RS (Reference Signal) are to be supported. The SL-CSI-RS may be referred to as SL-SRS (Sounding Reference Signal), etc. It is also assumed that feedback in the PHY layer, the MAC layer, and the RRC layer is supported.

Therefore, in the SL transmission, the CSI report may be sent to the base station apparatus 10 or the user equipment 20. A CSI report may include RI (Rank Indicator), LI (Layer Indicator), wideband or sub-band CQI (Channel quality indicator), CRI (CSI-RS Resource Indicator), SSB (Synchronization signal block) index, SRI (Scheduling request indicator), an index associated with other SS or RS, RSRP, RSRQ, RSSI (Received Signal Strength Indicator), and SNR (signal-to-noise ratio). The RSRP, RSRQ, RSSI, and SNR may be measured in layer 1 that is not filtered, or may be measured after a layer 3 filter has been applied.

The parameters included in the above CSI report are determined based on SL measurement. Measurement or reporting using signals of SLSS and SL-CSI-RS, is configured in the user equipment 20. Based on the report, the base station apparatus 10 or the user equipment 20 determines at least one of MCS (Modulation and Coding Scheme), TBS (Transport block size), rank or number of transmission layers, resource allocation, transmission power, and transmission timing.

As illustrated in FIG. 2, in step 1, the user equipment 20A transmits SLSS or SL-CSI-RS to the user equipment 20B. Subsequently, in step 2, the user equipment 20B transmits an SL-CSI report to the base station apparatus 10 based on the measurement result of the received SLSS or SL-CSI-RS. Subsequently, in step 3, the base station apparatus 10 determines the SL scheduling information of the user equipment 20A, based on the received SL-CSI report, and transmits the SL scheduling information to the user equipment 20A via DCI as in Mode 3. Subsequently, in step 4, the user equipment 20A transmits PSCCH (Physical Sidelink Control Channel) and/or PSSCH (Physical Sidelink Shared Channel) to the user equipment 20B based on the received SL scheduling information.

As described above, the base station apparatus 10 can transmit the SL scheduling information, determined based on the SL-CSI report including the measurement result of SLSS or SL-CSI-RS, to the user equipment 20 via the DCI. Note that the base station apparatus 10 illustrated in FIG. 2 may be replaced with the user equipment 20 having a scheduling capability. The user equipment 20 having a scheduling capability determines and reports, with respect to another user equipment 20, at least one of an MCS (Modulation and Coding Scheme), a TBS (Transport block size), a rank or a number of transmission layers, resource allocation, transmission power, and transmission timing, based on an instruction from the base station apparatus 10 or autonomously. In FIG. 2, when the base station apparatus 10 is replaced with the user equipment 20, the transmission of the SL scheduling information in step 3 may be performed via the SCI.

Figure 3:
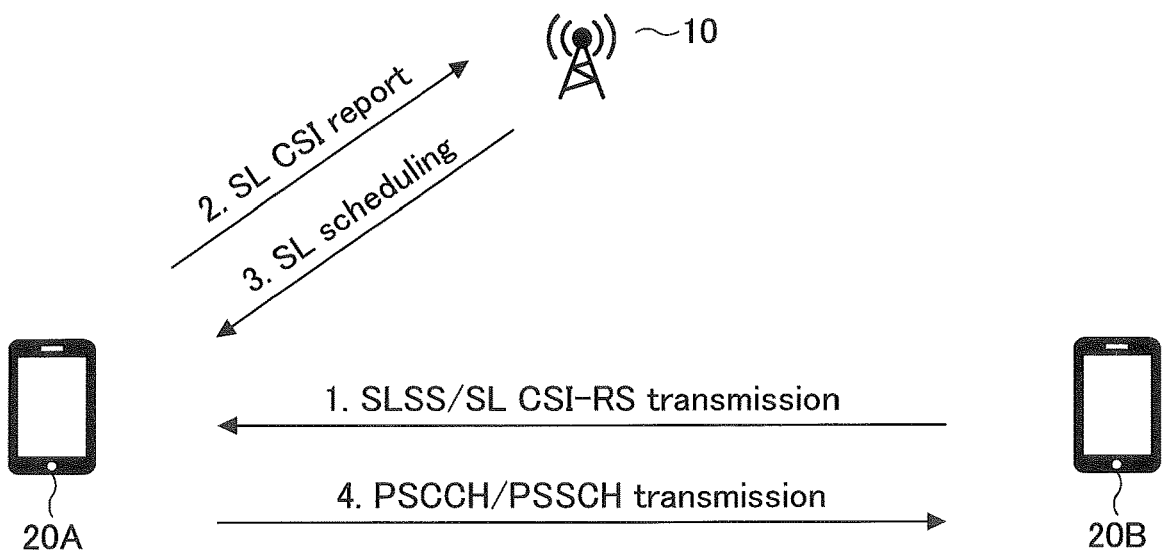
FIG. 3 is a diagram for describing an example (2) of a CSI report according to the embodiment of the present invention.

FIG. 3 is a diagram for describing an example (2) of the CSI report according to the embodiment of the present invention. In FIG. 3, a mode of a SL-CSI report different from that of FIG. 2, will be described.

As illustrated in FIG. 3, in step 1, the user equipment 20B transmits SLSS or SL-CSI-RS to the user equipment 20A. Subsequently, in step 2, the user equipment 20A transmits a SL-CSI report to the base station apparatus 10 based on the measurement result of the received SLSS or SL-CSI-RS. Subsequently, in step 3, the base station apparatus 10 determines the SL scheduling information of the user equipment 20A based on the received SL-CSI report, and transmits the SL scheduling information to the user equipment 20A via DCI as in Mode 3. Subsequently, in step 4, the user equipment 20A transmits PSCCH and/or PSSCH to the user equipment 20B based on the received SL scheduling information. Step 2 and step 3 may be omitted when the user equipment 20A autonomously determines the SL scheduling information as in Mode 4 based on the measurement value of SLSS or SL-CSI-RS.

Here, the SL-CSI report transmitted from the user equipment 20A to the base station apparatus 10 in step 2 may include, for example, information indicating the state of the channel to be transmitted from the user equipment 20A to the user equipment 20B. This information is calculated by beam correspondence from the result of receiving signals from the user equipment 20B by applying reception beamforming.

"Beam correspondence" is also referred to as "Tx/Rx beam correspondence", and a UE (User Equipment) capable of "beam correspondence" is meant to satisfy at least one of the following conditions 1) and 2). The following conditions 1) and 2) are conditions when the apparatus A and the apparatus B communicate, and the apparatus A corresponds to a UE capable of "beam correspondence". The apparatus A or the apparatus B may be the user equipment 20 or the base station apparatus 10.

1) Apparatus A can determine the transmission beam for transmission to apparatus B, based on the measurement result of signals received from apparatus B by applying one or more apparatus A side reception beamforming.
2) Apparatus A can determine the reception beamforming for receiving signals from apparatus B, based on a report from apparatus B including the measurement result of one or more apparatus A side transmission beams.

In FIG. 3, it is assumed that the "beam correspondence" of the user equipment 20A satisfies at least the condition 1) described above.

As described above, the base station apparatus 10 can transmit the SL scheduling information determined based on the SL-CSI report including the measurement result of SLSS or SL-CSI-RS, to the user equipment 20 via the DCI. Note that the base station apparatus 10 illustrated in FIG. 3 may be replaced with the user equipment 20 having a scheduling capability. In FIG. 3, when the base station apparatus 10 is replaced with the user equipment 20, the transmission of the SL scheduling information in step 3 may be performed via the SCI.

Figure 4:
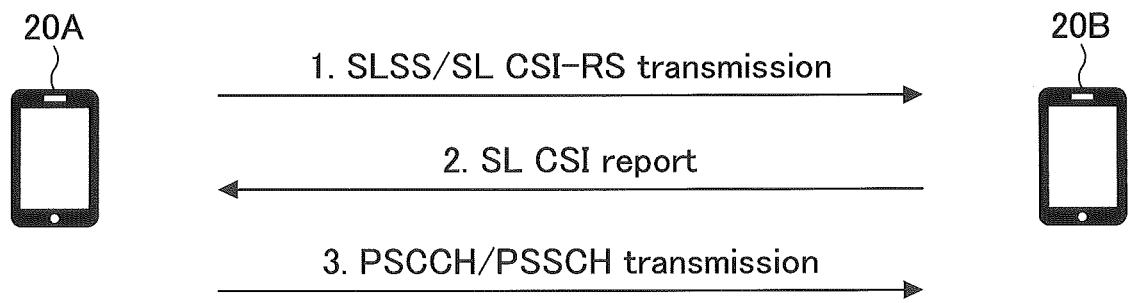
FIG. 4 is a diagram for describing an example (3) of a CSI report according to the embodiment of the present invention.

FIG. 4 is a diagram for describing an example (3) of the CSI report according to the embodiment of the present invention. In FIG. 4, a mode in which the SL-CSI report is transmitted from the user equipment 20B to the user equipment 20A will be described.

As illustrated in FIG. 4, in step 1, the user equipment 20A transmits SLSS or SL-CSI-RS to the user equipment 20B. Subsequently, in step 2, the user equipment 20B transmits a SL-CSI report to the user equipment 20A based on the measurement result of the received SLSS or SL-CSI-RS. Subsequently, in step 3, the user equipment 20A autonomously determines the SL scheduling information as in Mode 4 based on the received SL-CSI report, and based on the SL scheduling information, the user equipment 20A transmits PSCCH and/or PSSCH to the user equipment 20B.

As described above, the user equipment 20A can perform SL transmission with respect to the user equipment 20B, with the SL scheduling information determined based on the SL-CSI report including the measurement result of SLSS or SL-CSI-RS.

Figure 5:
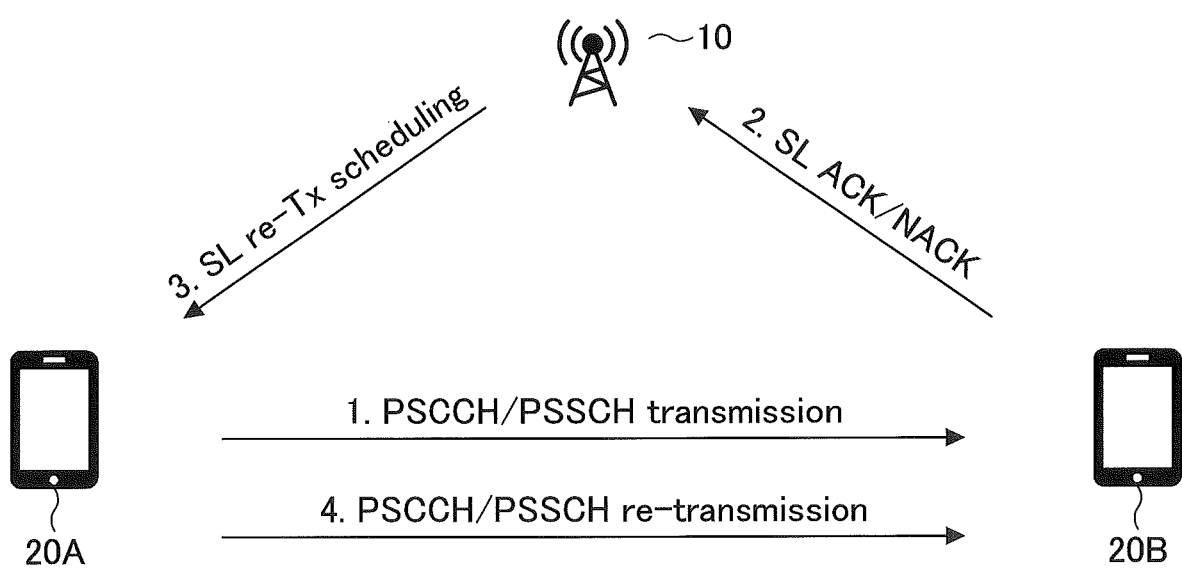
FIG. 5 is a diagram for describing an example (1) of HARQ re-transmission according to the embodiment of the present invention.

FIG. 5 is a diagram for describing an example (1) of HARQ re-transmission according to the embodiment of the present invention. In SL transmission, ACK/NACK signaling to the base station apparatus 10 or the user equipment 20 by HARQ (Hybrid automatic repeat request), may be supported. In SL transmission, ACK/NACK is signaled to the base station apparatus 10 or the user equipment 20. When NACK is received, the base station apparatus 10 or the user equipment 20 requests re-transmission of PSCCH and/or PSSCH, to the user equipment 20 that has transmitted the PSCCH and/or PSSCH.

As illustrated in FIG. 5, in step 1, the user equipment 20A transmits PSCCH and/or PSSCH to the user equipment 20B. Subsequently, in step 2, the user equipment 20A transmits SL-ACK/NACK signaling to the base station apparatus 10, based on the reception result of the received PSCCH and/or PSSCH.

Subsequently, in step 3, the base station apparatus 10 determines the SL scheduling information for re-transmission for the user equipment 20A, based on the received SL-ACK/NACK signaling, and transmits the SL scheduling information to the user equipment 20A via the DCI as in Mode 3. Subsequently, in step 4, the user equipment 20A re-transmits PSCCH and/or PSSCH to the user equipment 20B based on the received SL scheduling information for re-transmission.

As described above, the base station apparatus 10 can transmit, to the user equipment 20 via the DCI, the SL scheduling information for re-transmission determined based on the SL-ACK/NACK signaling. Note that the base station apparatus 10 illustrated in FIG. 5 may be replaced with the user equipment 20 having a scheduling capability. In FIG. 5, when the base station apparatus 10 is replaced with the user equipment 20, the transmission of the SL scheduling information in step 3 may be performed via the SCI.

Figure 6:
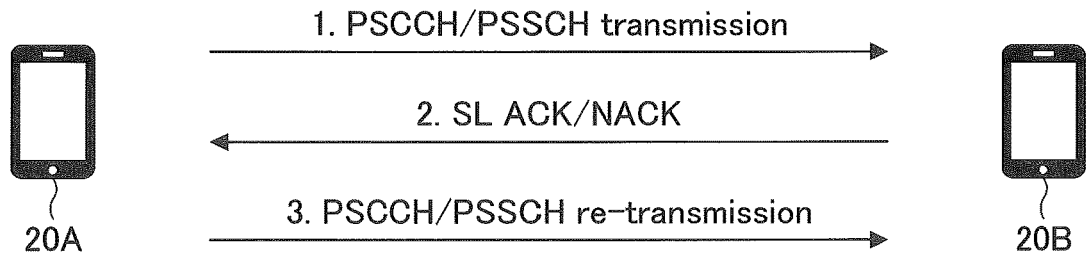
FIG. 6 is a diagram for describing an example (2) of HARQ re-transmission according to the embodiment of the present invention.

FIG. 6 is a diagram for describing an example (2) of HARQ re-transmission according to the embodiment of the present invention. In FIG. 6, a mode in which the SL-ACK/NACK signaling is transmitted from the user equipment 20B to the user equipment 20A will be described.

As illustrated in FIG. 6, in step 1, the user equipment 20A transmits PSCCH and/or PSSCH to the user equipment 20B. Subsequently, in step 2, the user equipment 20B transmits the SL-ACK/NACK signaling to the user equipment 20A based on the reception result of the received PSCCH and/or PSSCH. Subsequently, in step 3, the user equipment 20A autonomously determines the SL scheduling information for re-transmission as in Mode 4, based on the received SL-ACK/NACK signaling, and based on the SL scheduling information, the user equipment 20A re-transmits PSCCH and/or PSSCH to the user equipment 20B.

As described above, the user equipment 20A can execute re-transmission of SL to the user equipment 20B, with SL scheduling information for re-transmission determined based on SL-ACK/NACK signaling.

As described in FIGS. 2 to 6, the CSI or HARQ-ACK/NACK in the SL is determined based on the SL measurement result and the decoding result of the transport block. The base station apparatus 10 or the user equipment 20 determines details of the SL scheduling information, based on a report from the user equipment 20 not transmitting SL or the user equipment 20 transmitting SL. The user equipment 20 not transmitting SL corresponds to the user equipment 20B in FIG. 2, and the user equipment 20 transmitting SL corresponds to the user equipment 20A in FIG. 3.

Information other than CSI or HARQ-ACK/NACK, for example, BSR (Buffer status report), PHR (Power Head room), and Tx/Rx timing, etc., are transmitted from the user equipment 20 via UL to the base station apparatus 10 as in the case of FIG. 2 or 3.

Furthermore, a TPC (Transmit Power Control) command, a TA (Timing Advance) command, a TCI (Transmission Configuration Indicator), SRI, and an index related to other beams, may be transmitted from the base station apparatus 10 to the user equipment 20 via DL as in the case of FIG. 2 or 3.

In the operations of the user equipment 20 or the base station apparatus 10 described with reference to FIGS. 2 to 6, the structure of UCI (uplink control information) in NR or related operations may be similarly used. In the operations of the base station apparatus 10 or the user equipment 20 described with reference to FIGS. 2 to 6, the structure of the DCI in NR or related operations may be similarly used. The SL-CSI report or HARQ signaling described with reference to FIGS. 2 to 6, may be similarly applied in transmission using another channel, for example, PSBCH (Physical Sidelink Broadcast Channel) or PSDCH (Physical Sidelink Discovery Channel).

Figure 7:
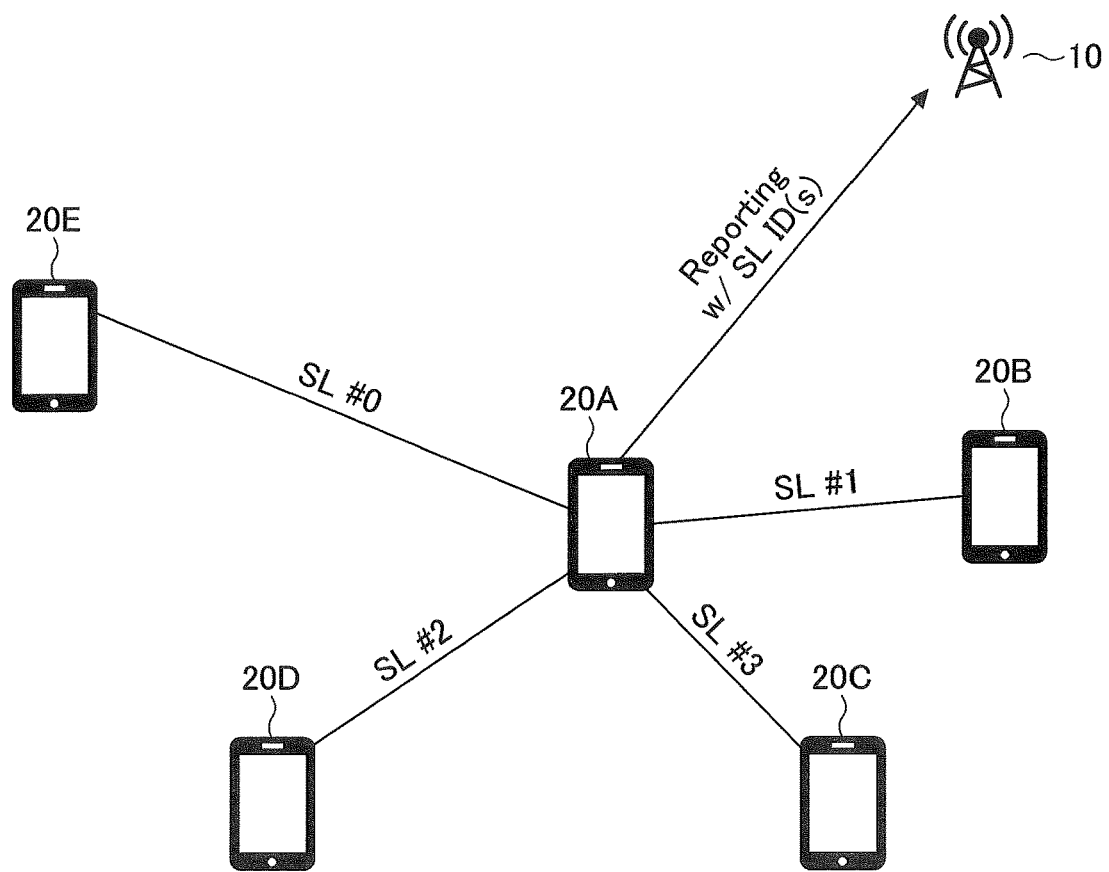
FIG. 7 is a diagram for describing an example (1) of operations of a wireless communication system according to the embodiment of the present invention.

FIG. 7 is a diagram for describing an example (1) of the operation of the radio communication system according to the embodiment of the present invention. When a report related to the SL is transmitted to the base station apparatus 10 or the user equipment 20 performing scheduling, a SL link ID may be attached to the SL-CSI report and the HARQ-ACK/NACK signaling and transmitted.

The SL link ID may be reported explicitly by the ID of the destination UE and the ID of the source UE, or an ID associated with these IDs. In the example illustrated in FIG. 7, SL #0, which is an the SL link ID, corresponds to SL between the user equipment 20A and the user equipment 20E; SL #1 corresponds to the SL between the user equipment 20A and the user equipment 20B; SL #2 corresponds to the SL between the user equipment 20A and the user equipment 20D, SL #3 corresponds to the SL between the user equipment 20A and the user equipment 20C; and the user equipment 20A may transmit, to the base station apparatus 10, a report related to SL, upon attaching, to the report, an ID of the destination UE and/or an ID of the source UE corresponding to SL link ID.

Part of or the entirety of the ID of the destination UE or the ID of the source UE may be derived from an RNTI (Radio Network Temporary Identifier) used for scrambling. As the SL link ID, a group ID indicating a plurality of SL link IDs may be used.

Instead of or in addition to the SL link ID, a measurement/report ID may be used. The measurement/report ID may be given from a configuration of measurement or a configuration of reporting related to SL. The measurement/report ID may be an ID in the RRC layer. Furthermore, an SS/RS resource ID may be used. The SS/RS resource ID is an ID associated with a resource in which the SS is transmitted or a resource in which the RS is transmitted.

When the user equipment 20 performing the SL transmission executes the reporting, the SL link ID may be given an index by the user equipment 20 performing the SL transmission, and may be reported to the base station apparatus 10 or the user equipment 20 performing the scheduling.

Figure 8:
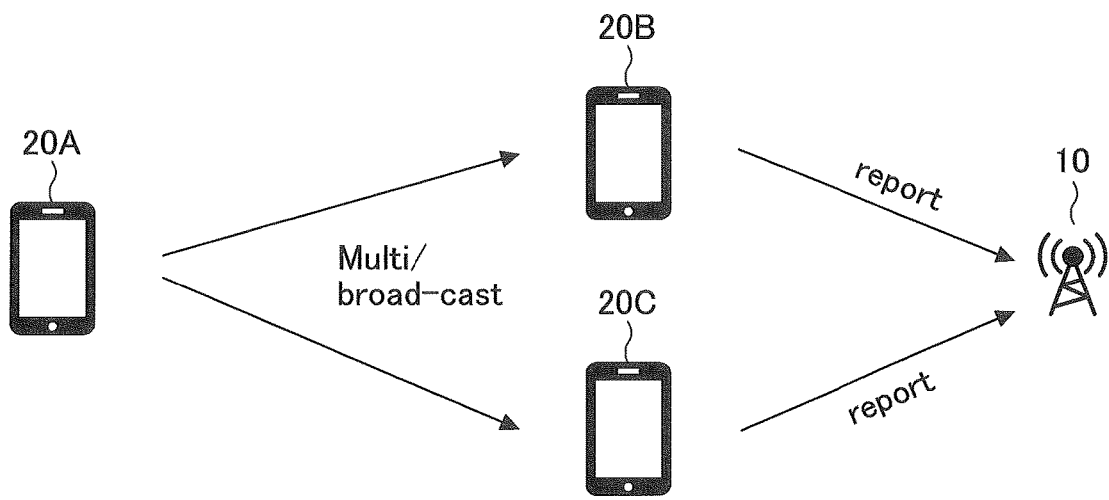
FIG. 8 is a diagram for describing an example (2) of the operations of the wireless communication system according to the embodiment of the present invention.

FIG. 8 is a diagram for describing an example (2) of the operation of the radio communication system according to the embodiment of the present invention. The SL-CSI reporting or the HARQ-ACK/NACK signaling may be executed by a plurality of user equipments 20.

As illustrated in FIG. 8, the user equipment 20A performs multicasting or broadcasting of SLSS, SL-CSI-RS, PSCCH, or PSSCH, and the user equipment 20B and the user equipment 20C receive this information. The user equipment 20B and the user equipment 20C may execute the SL-CSI reporting to the base station apparatus 10, respectively. The base station apparatus 10 may perform the SL scheduling with respect to the user equipment 20A, based on the received plurality of SL-CSI reports.

The reporting or measurement of SL-CSI may be configured so as to be executed by a plurality of user equipments 20. The reporting or measurement of the SL-CSI for the plurality of user equipments 20 may be configured via any one of PBCH (Physical Broadcast Channel), PDCCH (Physical Downlink Control Channel), or PDSCH (Physical Downlink Shared Channel), or may be configured via signaling of any one of the PHY layer, the MAC layer, or the RRC layer. When configuring via PDCCH, a group common RNTI (group-common RNTI) may be used to identify a plurality of user equipments 20.

Figure 9:
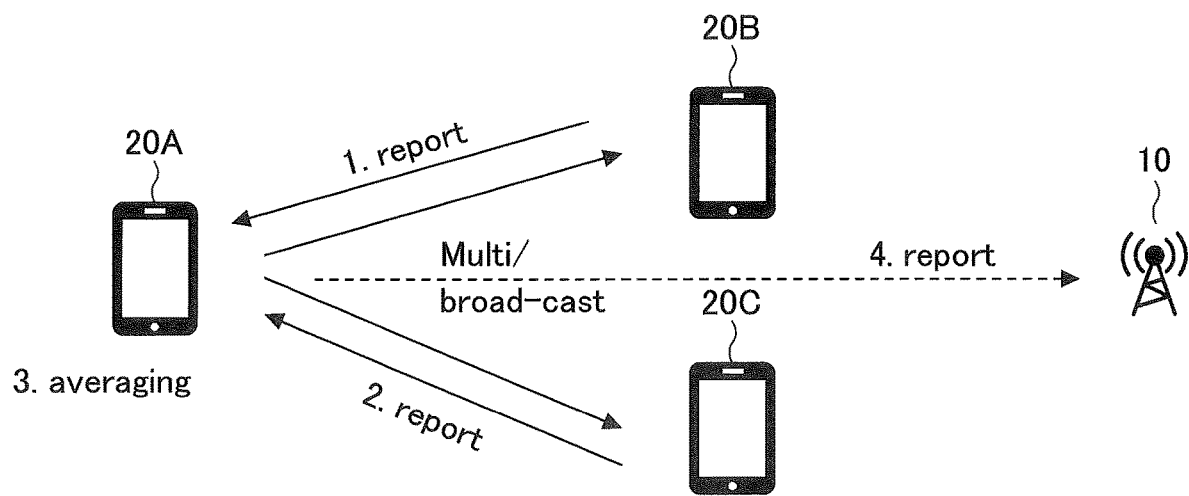
FIG. 9 is a diagram for describing an example (3) of the operations of the wireless communication system according to the embodiment of the present invention.

FIG. 9 is a diagram for describing an example (3) of the operations of the radio communication system according to the embodiment of the present invention. When the user equipment 20 transmitting the SL executes multicasting or broadcasting, the parameter of the SL-CSI report to be reported may be a value averaged among a plurality of SLs.

As illustrated in FIG. 9, the user equipment 20A performs multicasting or broadcasting of SLSS, SL-CSI-RS, PSCCH, or PSSCH, and the user equipment 20B and the user equipment 20C receive this information. The user equipment 20B and the user equipment 20C execute the SL-CSI reporting to the user equipment 20A, respectively. The user equipment 20A may create an SL-CSI report based on the result of averaging two or more values, with respect to the parameters included in the received plurality of SL-CSI reports, and may report the created SL-CSI report to the base station apparatus 10.

The SL-CSI report transmitted to the base station apparatus 10 from the user equipment 20A, may include information indicating whether the report is a SL-CSI report corresponding to the unicasting or a SL-CSI report corresponding to the broadcasting.

The SL link ID corresponding to unicasting or broadcasting may be given an index from the user equipment 20A that transmits the SL-CSI report to the base station apparatus 10.

Note that when the user equipment 20A has a scheduling capability, the user equipment 20A may execute the scheduling, without sending the SL-CSI report to the base station apparatus 10.

According to the embodiment described above, the user equipment 20 can transmit, to the base station apparatus 10 or another user equipment 20, a SL-CSI report or HARQ feedback of SL. The base station apparatus 10 or the user equipment 20 having a scheduling capability can perform more accurate scheduling or scheduling for re-transmission, based on the received SL-CSI report or HARQ feedback.

That is, in inter-terminal direct communication, the communication quality can be appropriately controlled.

(Apparatus Configuration)

Next, a functional configuration example of the base station apparatus 10 and the user equipment 20 that execute the above-described processes and operations, will be described. The base station apparatus 10 and the user equipment 20 include functions for implementing the above-described embodiments. However, each of the base station apparatus 10 and the user equipment 20 may have only some of the functions of the embodiments.

<Base Station Apparatus 10>

Figure 10:
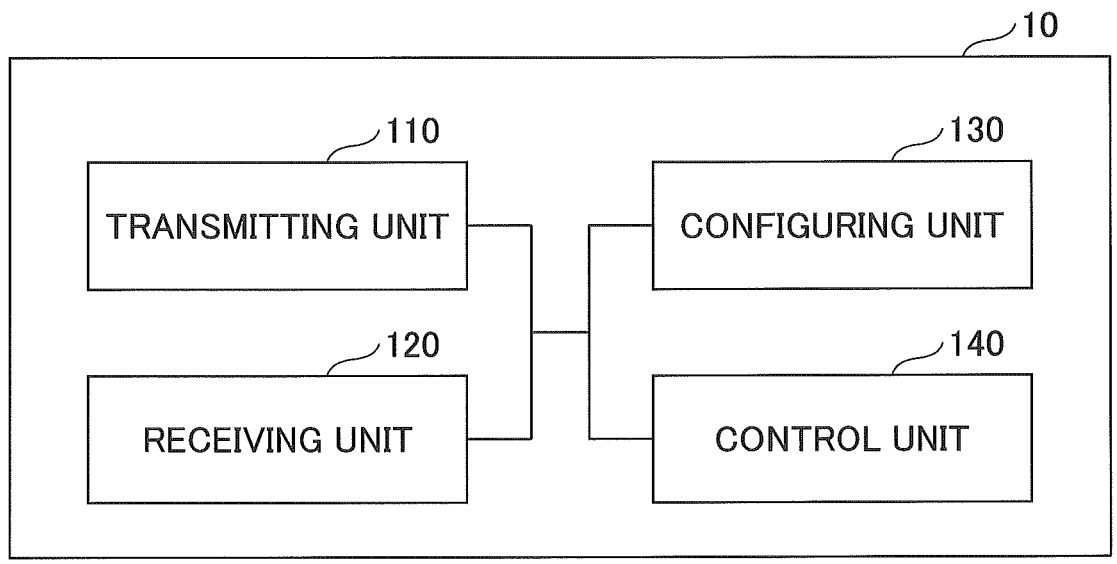
FIG. 10 is a diagram illustrating an example of a functional configuration of a base station apparatus 10 according to the embodiment of the present invention.

FIG. 10 is a diagram illustrating an example of a functional configuration of the base station apparatus 10. As illustrated in FIG. 10, the base station apparatus 10 includes a transmitting unit 110, a receiving unit 120, a configuring unit 130, and a control unit 140. The functional configuration illustrated in FIG. 10 is only an example. As long as the operations according to the embodiment of the present invention can be executed, the functional division and the name of the functional unit may be any functional division and name.

The transmitting unit 110 includes a function of generating signals to be transmitted to the user equipment 20, and transmitting the signals in a wireless manner. The receiving unit 120 includes a function of receiving various signals transmitted from the user equipment 20, and acquiring, for example, information of a higher layer from the received signals. Furthermore, the transmitting unit 110 has a function of transmitting NR-PSS, NR-SSS, NR-PBCH, and DL/UL control signals, etc., to the user equipment 20. Furthermore, for example, the transmitting unit 110 transmits information indicating that another terminal is approaching the user equipment 20, and the receiving unit 120 receives the terminal information from the user equipment 20.

The configuring unit 130 stores pre-configured configuration information and various kinds of configuration information to be transmitted to the user equipment 20, in a storage device, and reads these pieces of information from the storage device as necessary. The content of the configuration information is, for example, information related to scheduling of D2D communication.

As described in the embodiment, the control unit 140 performs processing related to configurations for performing D2D communication by the user equipment 20. Furthermore, the control unit 140 performs processing related to scheduling of D2D communication in response to a CSI report from the user equipment 20. A functional unit related to signal transmission in the control unit 140, may be included in the transmitting unit 110, and a functional unit related to signal reception in the control unit 140, may be included in the receiving unit 120.

<User Equipment 20>

Figure 11:
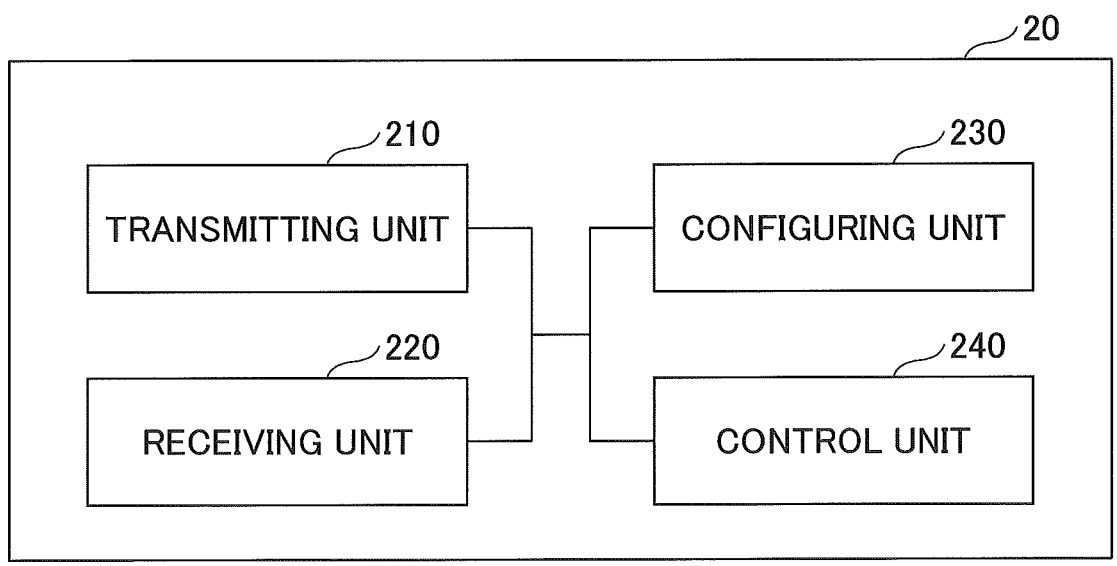
FIG. 11 is a diagram illustrating an example of a functional configuration of a user equipment 20 according to the embodiment of the present invention.

FIG. 11 is a diagram illustrating an example of a functional configuration of the user equipment 20. As illustrated in FIG. 11, the user equipment 20 includes a transmitting unit 210, a receiving unit 220, a configuring unit 230, and a control unit 240. The functional configuration illustrated in FIG. 11 is only an example. As long as the operations according to the embodiment of the present invention can be executed, the functional division and the name of the functional unit may be any functional division and name.

The transmitting unit 210 creates transmission signals from the transmission data and wirelessly transmits the transmission signals. The receiving unit 220 wirelessly receives various kinds of signals and acquires signals of a higher layer from the received signals of the physical layer. Furthermore, the receiving unit 220 has a function of receiving NR-PSS, NR-SSS, NR-PBCH, and DL/UL/SL control signals, etc., transmitted from the base station apparatus 10. Furthermore, for example, the transmitting unit 210 may transmit as D2D communication, to another user equipment 20, PSCCH (Physical Sidelink Control Channel), PSSCH (Physical Sidelink Shared Channel), PSDCH (Physical Sidelink Discovery Channel), and PSBCH (Physical Sidelink Broadcast Channel), etc., and the receiving unit 120 may receive, from another user equipment 20, PSCCH, PSSCH, PSDCH, or PSBCH, etc.

The configuring unit 230 stores various kinds of configuration information received from the base station apparatus 10 or the user equipment 20, by the receiving unit 220, in a storage device, and reads these pieces of information from the storage device as necessary. Furthermore, the configuring unit 230 also stores pre-configured configuration information. The content of the configuration information is, for example, information related to scheduling of D2D communication.

As described in the embodiment, the control unit 240 controls the D2D communication executed with another user equipment 20. Furthermore, the control unit 240 measures the quality of the D2D communication and reports the measurement result to the base station apparatus 10 or another user equipment 20. Furthermore, the control unit 240 performs processing related to the scheduling of the D2D communication according to a CSI report from another user equipment 20. A functional unit related to signal transmission in the control unit 240 may be included in the transmission unit 210, and a functional unit related to signal reception in the control unit 240 may be included in the reception unit 220.

<Hardware Configuration>

The functional diagrams (FIGS. 10 and 11) used in the description of the above embodiment of the present invention illustrate blocks of functional units. These functional blocks (constituent parts) are implemented by any combination of hardware and/or software. Furthermore, the means for implementing each functional block is not particularly limited. That is, the respective functional blocks may be implemented by a single device in which a plurality of elements are physically and/or logically combined; or two or more devices, which are physically and/or logically separated, may be directly and/or indirectly (for example, wired and/or wireless) connected, and the respective functional blocks may be implemented by these plural devices.

Figure 12:
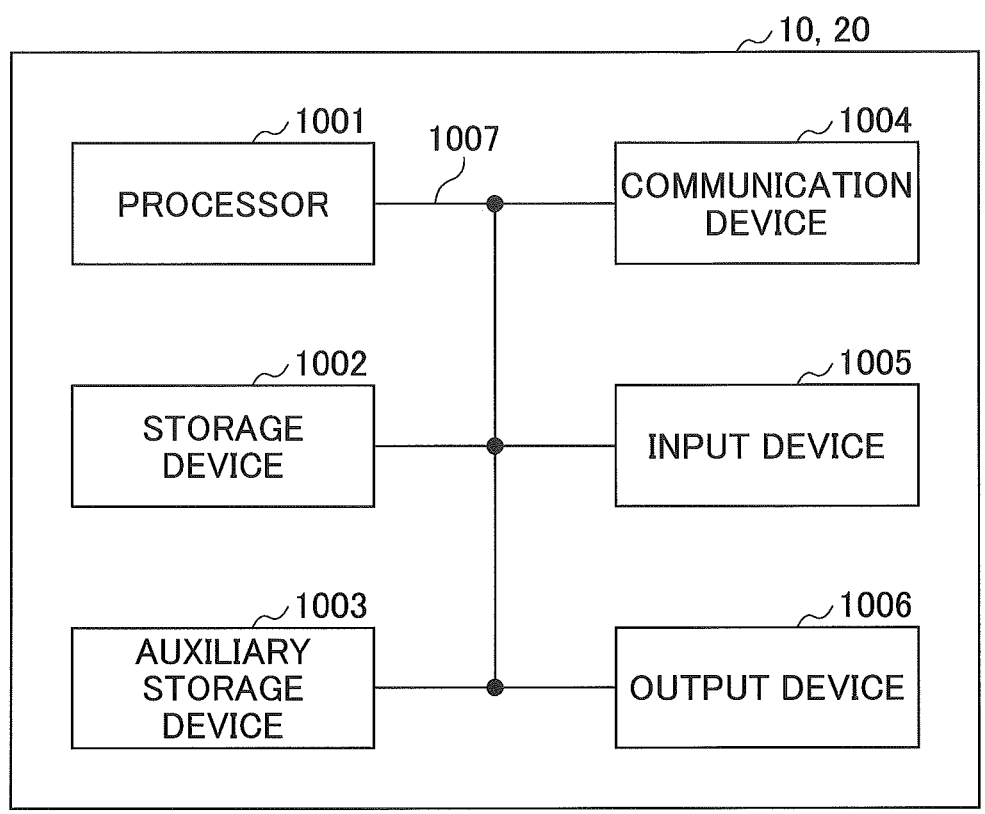
FIG. 12 is a diagram illustrating an example of a hardware configuration of the base station apparatus 10 or the user equipment 20 according to the embodiment of the present invention.

Furthermore, for example, both the base station apparatus 10 and the user equipment 20 according to one embodiment of the present invention may function as a computer that performs processes according to an embodiment of the present invention. FIG. 12 is a diagram illustrating an example of a hardware configuration of a radio communication apparatus that is the base station apparatus 10 or the user equipment 20 according to an embodiment of the present invention. Each of the base station apparatus 10 and the user equipment 20 described above may be physically configured as a computer device including a processor 1001, a storage device 1002, an auxiliary storage device 1003, a communication device 1004, an input device 1005, an output device 1006, and a bus 1007, etc.

Note that in the following description, the term "device" can be read as a circuit, a device, and a unit, etc. The hardware configuration of the base station apparatus 10 and the user equipment 20 may be configured to include one or a plurality of devices indicated by the reference numerals 1001 to 1006 illustrated in the drawing, or may be configured to not include some of the devices.

The respective functions of the base station apparatus 10 and the user equipment 20 are implemented by having predetermined software (programs) to be loaded in the hardware such as the processor 1001 and the storage device 1002 so that the processor 1001 performs computation and controls the communication performed by the communication device 1004 and the reading and/or writing of data in the storage device 1002 and the auxiliary storage device 1003.

The processor 1001, for example, operates the operating system to control the entire computer. The processor 1001 may be configured with a Central Processing Unit (CPU) including an interface with peripheral devices, a control device, an arithmetic device, and a register, etc.

Furthermore, the processor 1001 loads programs (program codes), software modules, or data from the auxiliary storage device 1003 and/or the communication device 1004 into the storage device 1002, and executes various processes according to these elements. As the program, a program for causing a computer to execute at least part of the operation described in the above embodiment, is used. For example, the transmitting unit 110, the receiving unit 120, the configuring unit 130, and the control unit 140 of the base station apparatus 10 illustrated in FIG. 10 may be implemented by a control program that is stored in the storage device 1002 and that operates on the processor 1001. Furthermore, for example, the transmitting unit 210, the receiving unit 220, the configuring unit 230, and the control unit 240 of the user equipment 20 illustrated in FIG. 11 may be implemented by a control program that is stored in the storage device 1002 and that operates on the processor 1001. Although it has been described that the various processes described above are executed by a single processor 1001, the various processes described above may be executed simultaneously or sequentially by two or more processors 1001. The processor 1001 may be implemented by one or more chips. Note that the programs may be transmitted from the network via an electric communication line.

The storage device 1002 is a computer-readable recording medium, and is configured with at least one of a ROM (Read-Only Memory), an EPROM (Erasable Programmable ROM), an EEPROM (Electrically Erasable Programmable ROM), and a RAM (Random Access Memory), for example. The storage device 1002 may be referred to as a register, a cache, and a main memory (main memory), etc. The storage device 1002 can store executable programs (program codes) and software modules, etc., for implementing the processes according to an embodiment of the present invention.

The auxiliary storage device 1003 is a computer-readable recording medium, and may be configured with at least one of, for example, an optical disk such as a CD-ROM (Compact Disc ROM), a hard disk drive, a flexible disk, a magneto-optical disk (for example, a compact disk, a digital versatile disk, a Blu-ray (Registered trademark) disk), a smart card, a flash memory (for example, a card, a stick, a key drive), a floppy (registered trademark) disk, and a magnetic strip, etc. The auxiliary storage device 1003 may be referred to as an auxiliary storage device. The above-described storage medium may be, for example, a database including the storage device 1002 and/or the auxiliary storage device 1003, a server, or other appropriate media.

The communication device 1004 is hardware (transmission/reception device) for performing communication between computers via a wired and/or wireless network, and is also referred to as a network device, a network controller, a network card, and a communication module, etc., for example. For example, the transmitting unit 110 and the receiving unit 120 of the base station apparatus 10 may be implemented by the communication device 1004. Furthermore, the transmitting unit 210 and the receiving unit 220 of the user equipment 20 may be implemented by the communication device 1004.

The input device 1005 is an input device (for example, a keyboard, a mouse, a microphone, a switch, a button, and a sensor, etc.) that accepts input of information from the outside. The output device 1006 is an output device (for example, a display, a speaker, and an LED lamp, etc.) that outputs information to the outside. Note that the input device 1005 and the output device 1006 may be integrated (for example, a touch panel).

Furthermore, the respective devices such as the processor 1001 and the storage device 1002 are connected by the bus 1007 for communicating information. The bus 1007 may be configured with a single bus or may be configured with different buses between the respective devices.

Furthermore, each of the base station apparatus 10 or the user equipment 20 may include hardware such as a microprocessor, a digital signal processor (DSP), an application specific integrated circuit (ASIC), a programmable logic device (PLD), and a field programmable gate array (FPGA), and some of or all of the functional blocks may be implemented by this hardware. For example, the processor 1001 may be implemented with at least one of these hardware elements.

OVERVIEW OF EMBODIMENT

As described above, according to the embodiment of the present invention, there is provided a user equipment that communicates with a first user equipment or a base station apparatus, the user equipment including a receiving unit configured to receive a synchronization signal or a reference signal used in sidelink transmitted from the first user equipment; a control unit configured to measure a channel state of sidelink, based on the synchronization signal or the reference signal; and a transmitting unit configured to transmit, to the base station apparatus or the first user equipment, information indicating the channel state of sidelink.

With the above configuration, the user equipment 20 can transmit a SL-CSI report to the base station apparatus 10 or another user equipment 20. Based on the received SL-CSI report, the base station apparatus 10 or the user equipment 20 having a scheduling capability can perform more accurate scheduling or scheduling for re-transmission. That is, in inter-terminal direct communication, the communication quality can be appropriately controlled.

The transmitting unit may transmit a channel of sidelink to the first user equipment. With this configuration, the user equipment 20 that has received the synchronization signal or the reference signal of sidelink transmits the SL-CSI report to the base station apparatus 10 or another user equipment 20, and receives scheduling based on the SL-CSI report, and, therefore, it is possible to improve the transmission efficiency of the own user equipment.

The transmitting unit may transmit, to a second user equipment, a synchronization signal or a reference signal used in sidelink; the receiving unit may receive, from the second user equipment, information indicating a channel state of sidelink; and the control unit may determine scheduling information of sidelink to be transmitted to the second user equipment, based on the information indicating the channel state of sidelink received from the second user equipment. With this configuration, the user equipment 20 can transmit the SL-CSI report to another user equipment 20. Based on the received SL-CSI report, the user equipment 20 having a scheduling capability can perform more accurate scheduling or scheduling for re-transmission.

The receiving unit may receive a channel of sidelink from the first user equipment, and the transmitting unit may transmit, to the base station apparatus or the first user equipment, information indicating whether data included in the channel of sidelink has been decoded. With this configuration, the user equipment 20 can improve the communication quality by applying the HARQ feedback to SL.

The transmitting unit may transmit, to a plurality of user equipments, a synchronization signal or a reference signal used in sidelink; the receiving unit may receive, from each of the plurality of user equipments, information indicating a channel state of sidelink; and the control unit may transmit, to the base station apparatus, information indicating a channel state of sidelink obtained by averaging parameters included in a plurality of pieces of the information indicating the channel state of sidelink received from each of the plurality of user equipments. With this configuration, the user equipment 20 can transmit, to the base station apparatus 10, the SL-CSI report in which the channel state of sidelink of the plurality of user equipments 20 is applied.

Furthermore, according to the embodiment of the present invention, there is provided a base station apparatus that communicates with a user equipment, the base station apparatus including a receiving unit configured to receive, from the user equipment, information indicating a channel state of sidelink measured based on a synchronization signal or a reference signal used in sidelink; a control unit configured to determine scheduling information of sidelink, based on the information indicating the channel state of sidelink; and a transmitting unit configured to transmit the scheduling information of sidelink to the user equipment.

With the above configuration, the user equipment 20 can transmit the SL-CSI report to the base station apparatus 10 or another user equipment 20. Based on the received SL-CSI report, the base station apparatus 10 or the user equipment 20 having a scheduling capability can perform more accurate scheduling or scheduling for re-transmission. That is, in inter-terminal direct communication, the communication quality can be appropriately controlled.

Supplement to Embodiment

The exemplary embodiment of the present invention is described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for description, but the numerical values are merely examples, and certain suitable values may be used unless otherwise stated. The classification of items in the above description is not essential to the present invention, matters described in two or more items may be combined and used as necessary, and a matter described in one item may be applied to a matter described in another item (unless there is no contradiction). The boundary between functional units or processing units in a functional block diagram does not necessarily correspond to the boundary between physical parts. Operations of a plurality of functional units may be performed physically by one component, or an operation of one functional unit may be performed physically by a plurality of parts. In the processing procedures described in the embodiment, the order of processes may be changed as long as there is no inconsistency. For the sake of convenience of description, the base station apparatus 10 and the user equipment 20 have been described using the functional block diagrams, but such apparatuses may be implemented by hardware, software, or a combination thereof. Software executed by the processor included in the base station apparatus 10 according to the embodiment of the present invention, and the software executed by the processor of the user equipment 20 according to the embodiment of the present invention, may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, notification of information is not limited to the aspect/embodiment described in the present specification, and may be performed by other methods. For example, the notification of information may be performed by physical layer signaling (for example, DCI (Downlink Control Information), UCI (Uplink Control Information)), upper layer signaling (for example, RRC (Radio Resource Control) signaling, MAC (Medium Access Control) signaling, broadcast information (MIB (Master Information Block), SIB (System Information Block)), other signals, or a combination of these methods. Furthermore, the RRC signaling may be referred to as an RRC message, and may be, for example, an RRC Connection Setup message or an RRC Connection Reconfiguration message, etc.

Each aspect/embodiment described in the present specification may be applied to LTE (Long Term Evolution), LTE-A (LTE-Advanced), SUPER 3G, IMT-Advanced, 4G, 5G, FRA (Future Radio Access), W-CDMA (registered trademark), GSM, (registered trademark), CDMA2000, UMB (Ultra Mobile Broadband), IEEE 802.11 (Wi-Fi), IEEE 802.16 (WiMAX), IEEE 802.20, UWB (Ultra-Wide-Band), Bluetooth (registered trademark), and a system using other appropriate systems and/or a next generation system expanded based on these systems.

In the processes, sequences, and flowcharts, etc., in each aspect/embodiment described in the present specification, the order of processes may be exchanged, as long as there is no inconsistency. For example, for the methods described in the present specification, elements of the various steps are presented in an exemplary order and are not limited to the presented specific order.

The specific operation that is performed by the base station apparatus 10 in the present specification may be performed by an upper node of the base station apparatus 10 in some cases. It is obvious that in a network including one or more network nodes including the base station apparatus 10, various operations performed for communication with the user equipment 20, may be performed by the base station apparatus 10 and/or a network node of other than the base station apparatus 10 (for example, MME or S-GW, etc., although not limited as such). In the above example, there is one network node other than the base station apparatus 10; however, a combination of a plurality of other network nodes (for example, MME and S-GW) may be used.

Each aspect/embodiment described in the present specification may be used singly or in combination, or may be switched in accordance with execution.

The user equipment 20 may be referred to, by those skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

The base station apparatus 10 may be referred to, by those skilled in the art, as a NB (Node B), an eNB (evolved Node B), gNB, a Base Station, or some other suitable term.

The terms "determining" and "deciding" used in the present specification may encompass a wide variety of operations. "Determining" and "deciding" may include the meaning of, for example, judging, calculating, calculating, computing, processing, deriving, investigating, looking up (for example, searching a table, a database, or another data structure), and ascertaining, etc. Furthermore, "determining" and "deciding" may include the meaning of receiving (for example, receiving information), transmitting (for example, transmitting information), inputting, outputting, and accessing (for example, accessing data in a memory). Furthermore, "determining" and "deciding" may include the meaning of resolving, selecting, choosing, establishing, and comparing, etc. In other words, "determining" and "deciding" include the meaning of "determining" and "deciding" some kind of operation.

The phrase "based on" used in the present specification does not mean "based only on", unless explicitly stated otherwise. In other words, the phrase "based on" means both "based only on" and "based on at least".

The terms "include", "including", and variations thereof used in the present specification or claims, are intended to be inclusive in a manner similar to the term "comprising". Furthermore, the term "or" used in the present specification or claims, is not intended to be exclusive OR.

In the entire present disclosure, if articles are added by translation, such as a, an, and the in English, for example, these articles may include a plural number of items/units, unless it is indicated that these articles are obviously not plural from the context.

Note that in the embodiment of the present invention, SLSS or SL-CSI-RS is an example of a synchronization signal or a reference signal used in a side link. The SL-CSI report is an example of information indicating the channel state of side link. HARQ-ACK/NACK signaling is an example of information indicating whether data has been decoded. The destination UE is an example of a transmission destination UE. The source UE is an example of a transmission source UE.

Although the present invention has been described in detail above, it will be obvious to those skilled in the art that the present invention is not limited to the embodiments described herein. The present invention can be implemented as modifications and variations without departing from the spirit and scope of the present invention as defined by the scope of the claims. Therefore, the description of the present specification is for the purpose of illustration and does not have any restrictive meaning to the present invention.

REFERENCE SIGNS LIST 10 base station apparatus
110 transmitting unit
120 receiving unit
130 configuring unit
140 control unit
20 user equipment
210 transmitting unit
220 receiving unit
230 configuring unit
240 control unit
1001 processor
1002 storage device
1003 auxiliary storage device
1004 communication device
1005 input device
1006 output device

The invention claimed is:

1. A terminal comprising:
a transmitter that transmits a Physical Sidelink Shared Channel (PSSCH) for Device-to-Device communication to a group including a plurality of terminals; and
a receiver that receives a response related to retransmission control of the PSSCH, from each of the plurality of terminals,
wherein the transmitter transmits, to a base station, information corresponding to the response related to retransmission control of the PSSCH,
wherein before transmission of the PSSCH, the transmitter transmits a Physical Sidelink Control Channel (PSCCH) associated with the transmission of the PSSCH, and
wherein the retransmission control of the PSSCH is scheduled by sidelink control information (SCI).

2. The terminal according to claim 1, wherein the transmitter transmits the PSSCH using an identifier indicating the group.

3. A communication method executed by a terminal, the communication method comprising:
transmitting a Physical Sidelink Shared Channel (PSSCH) for Device-to-Device communication to a group including a plurality of terminals;

receiving, from each of the plurality of terminals, a response related to retransmission control of the PSSCH;

transmitting, to a base station, information corresponding to the response related to retransmission control of the PSSCH; and before transmission of the PSSCH, transmitting a Physical Sidelink Control Channel (PSCCH) associated with the transmission of the PSSCH, wherein the retransmission control of the PSSCH is scheduled by sidelink control information (SCI).

4. A wireless communication system comprising:

a plurality of terminals that comprises a first terminal and a plurality of second terminals; and a base station, wherein the first terminal:

transmits a Physical Sidelink Shared Channel (PSSCH) for Device-to-Device communication to a group including the plurality of second terminals;

receives, from each of the plurality of second terminals, a response related to retransmission control of the PSSCH;

transmits, to the base station, information corresponding to the response related to retransmission control of the PSSCH; and before transmission of the PSSCH, transmits a Physical Sidelink Control Channel (PSCCH) associated with the transmission of the PSSCH, wherein the retransmission control of the PSSCH is scheduled by sidelink control information (SCI), and the base station receives, from the first terminal, the information corresponding to the response related to retransmission control of the PSSCH.

5. The terminal according to claim 1, wherein the receiver receives a response related to retransmission control of the PSSCH based on a transmission result of the PSSCH.

* * * * *